E. K. BAKER.
MOUNTING FOR TIRES.
APPLICATION FILED MAR. 20, 1912.

1,155,396.

Patented Oct. 5, 1915.
2 SHEETS—SHEET 1.

WITNESSES:
INVENTOR
Erle K. Baker
BY
ATTORNEY

E. K. BAKER.
MOUNTING FOR TIRES.
APPLICATION FILED MAR. 20, 1912.
1,155,396.
Patented Oct. 5, 1915.
2 SHEETS—SHEET 2.
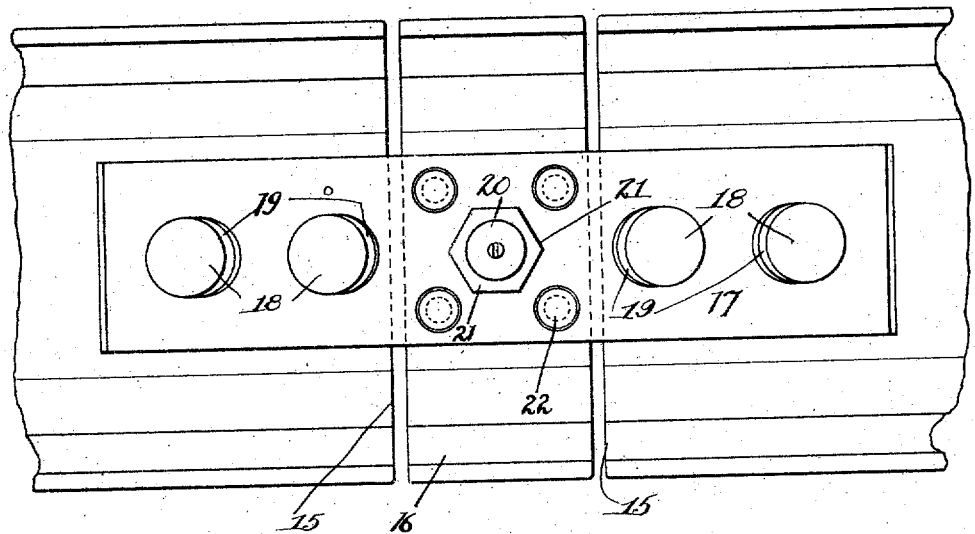
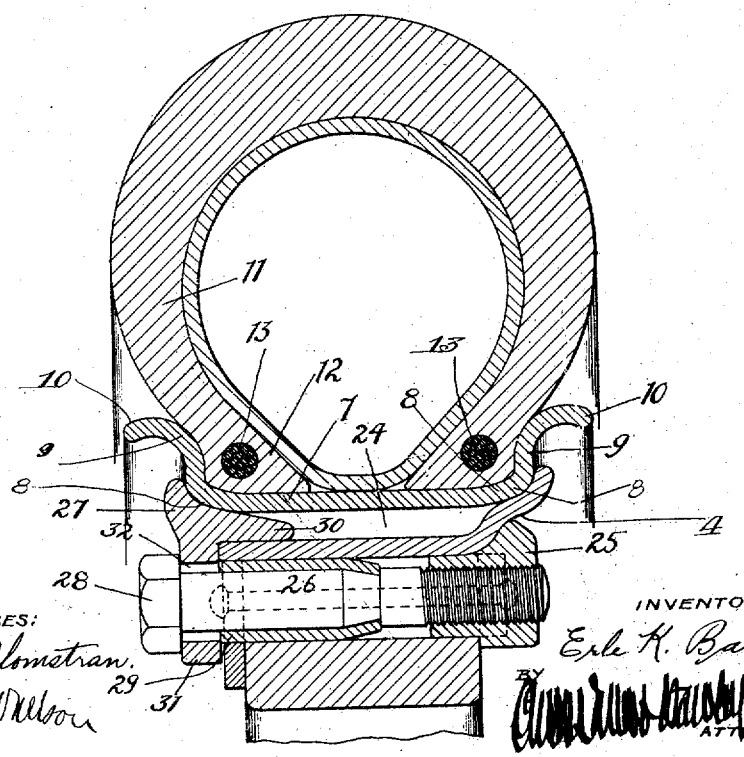

UNITED STATES PATENT OFFICE.

ERLE K. BAKER, OF CHICAGO, ILLINOIS, ASSIGNOR TO UNIVERSAL RIM COMPANY, OF CHICAGO, ILLINOIS, A CORPORATION OF ILLINOIS.

MOUNTING FOR TIRES.

1,155,396.  Specification of Letters Patent.  Patented Oct. 5, 1915.

Application filed March 20, 1912. Serial No. 685,102.

*To all whom it may concern:*

Be it known that I, ERLE K. BAKER, a citizen of the United States, and a resident of Chicago, Cook county, Illinois, have invented certain new and useful Improvements in Mountings for Tires, of which the following is a full, true, clear, and exact description.

My invention relates to improvements in tire mountings and has particular reference to rims for tires having non-stretchable base beads.

Generally my object is to provide a flanged rim adapted to receive a non-stretchable or non-expansible base bead tire; which shall serve as a carrier for the tire in inflated condition; which shall be formed to be easily placed upon and removed from such a tire; and which shall materially reduce the manufacturing cost of rims for tires of this type.

A further object of my invention is to provide a rim of the above character which shall comprise a minimum number of loose pieces and which shall be formed to interlock with a complementary wheel to prevent the relative rotation of the rim and the wheel.

My invention comprises a flanged tire-carrying rim having a portion of its circumference removed and thereby provided with a gap between its ends, which permits the rim to be easily reduced in diameter for insertion within and withdrawal from a tire having a non-stretchable base, and a gap filling rim section adapted to be held in position between the ends of the rim.

My invention further consists in a flanged tire rim composed of a major and a minor part, the major part being of such a length that there are spaces between its ends and the adjacent ends of the minor part when they are serving as a tire holder on a wheel the minor part at this line nearly filling the space between the ends of the major part.

My invention further consists in the novel features of construction and in the combinations of parts hereinafter fully described and particularly pointed out in the appended claims.

Figure 1:
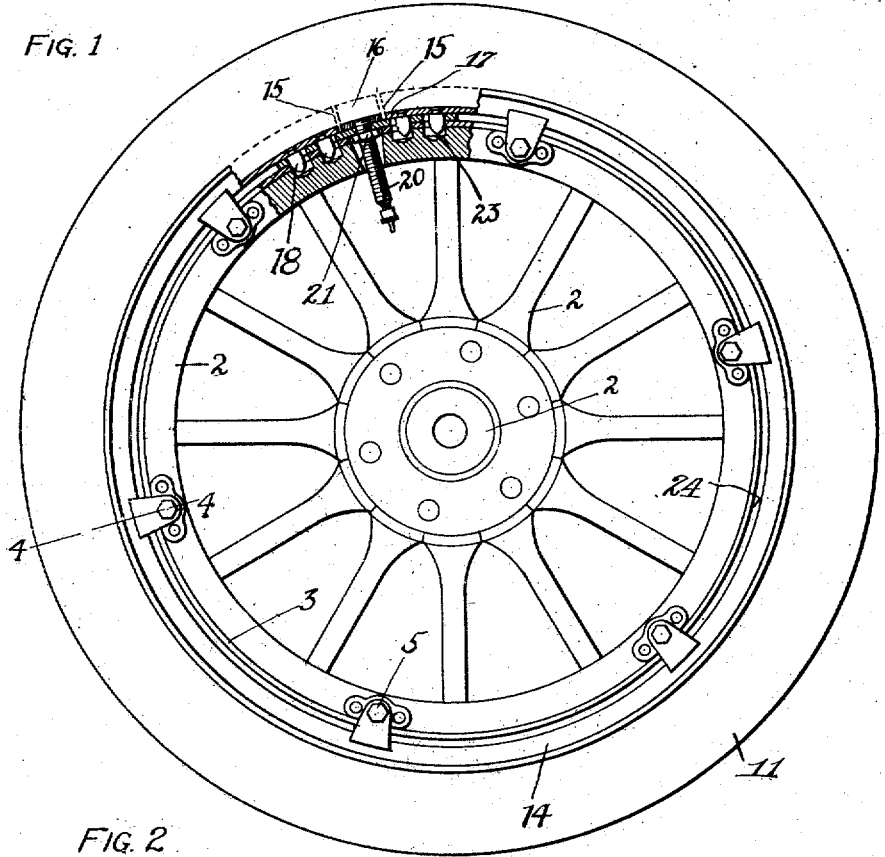
Figure 2:
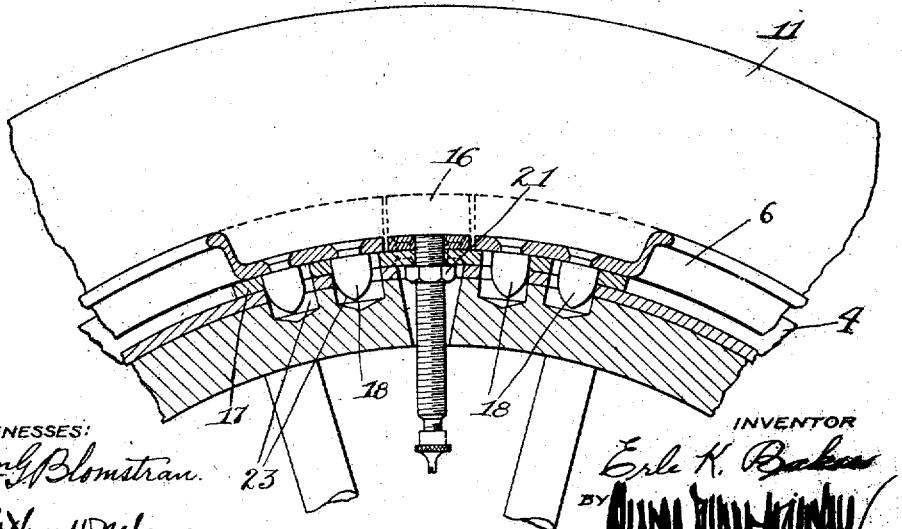

My invention will be more readily understood by reference to the accompanying drawings forming a part of this specification, and in which;

Figure 1 is a side elevation, partly in section of an automobile wheel and illustrating one embodiment of my invention; Fig. 2 is an enlarged view of the portion shown in section Fig. 1; Fig. 3 is an enlarged inside plan view of the tire rim showing the minor section or part in place between the ends of the major portion; and Fig. 4 is an enlarged detail sectional view through one of the clamping devices taken upon the line 4—4 of Fig. 1.

I have shown my invention as applied to a rim of the "Dunlop" type, but it should at once be understood that my invention is equally applicable to the clencher type of rim and tire. Automobile tires of the pneumatic type which have non-stretchable base beads, have usually been mounted upon rims, one flange at least of which is removable, and it has been found that rims of this character are more or less dangerous and unsatisfactory, in that a removable rim is liable, at times, to be accidentally dislodged from its position and thereby permit the escape of the tire. By means of my invention I am enabled to mount a tire having a substantially non-stretchable base upon a rim formed with integral tire retaining flanges one at each edge, and I am enabled to produce this style of tire mounting at a much lower manufacturing cost than that of a rim having a removable flange. I make the rim in the form of a ring split or cut at one point of its circumference, and I am enabled thereby to draw or spring one end of the rim toward its center and thereby reduce the diameter and circumference of the rim sufficiently to permit its insertion within the tire. Once the rim has been placed within the tire, it can readily be enlarged in diameter and circumference to properly seat the tire thereon. To facilitate the operation of decreasing the circumference of the rim, I make the rim of such a length that when it is positioned within the tire its ends are somewhat separated. This feature is of considerable value in rims that are relatively stiff as it would not be advisable to bend or spring one end of such a rim inwardly sufficiently to overlap the opposite end. In rims of this character the ends can simply be drawn toward each other and this contracts them sufficiently so that their flanges will pass through the tire in the operation of mounting or demounting the tire. I fill the gap or space between the ends of the rim by a relatively short section of the rim, and I hold this section in place by means of a bridge plate which overlaps and connects with the ends of the rim. I make this small section of such a length that when in position it does not quite fill the space between the ends of the rim, the parts being at normal temperature, so that when the parts become more heated and the rim expands in length, the lengthening of the rim may be taken care of without permitting the rim to enlarge its diameter. At such time that a rim is thus lengthened, it is retained in firm contact with its clamping devices by means of the cumulative pressure of the pneumatic tire for which the rim serves as a carrier.

As shown in the drawings the wheel is of the ordinary type composed of a hub, spokes and felly 2, and is provided with a felly band 3 having an annular rim retaining flange or seat 4 at one edge, and the wheel is provided with a plurality of rim clamps 5, spaced around the felly of the wheel and adapted to form a removable rim seat at the other edge of the felly. The tire rim 6, is of the "Dunlop" type and is provided with a substantially cylindrical or straight middle portion 7 bordered by inwardly inclined bearing portions 8, which end in outwardly extending tire flanges 9 the edges 10 of which are curved outwardly. The tire 11 has a base which fits within the flanged rim 6, and its base beads 12 are provided with a metallic cable 13 or are otherwise formed in such a manner that they are substantially non-expansible or non-stretchable. The tire rim 6 comprises a major portion 14 which is somewhat shorter than the inner periphery of the tire so that its ends 15 are separated. They are sufficiently separated so that when the ends 15 are brought together, the rim is so reduced in diameter that it can be easily inserted within or withdrawn from the tire. I provide a gap filler 16 which is of the same cross sectional shape as the major portion of the rim and is adapted to be placed upon the tire between the ends 15 of the rim. As shown in Fig. 3, I prefer to make this minor portion of the rim 16 somewhat shorter than the gap between the ends of the rim so that when the rim is relatively lengthened either by wear or by expansion, due to increase of temperature, the ends 15 may approach each other without enlarging the diameter of the rim. I retain this section 16 in place between the ends of the rim by means of a plate 17 which is conformed to the inner periphery of the rim and overlaps the ends thereof. Each end of the rim is provided with inwardly extending projections 18, and the plate 17 is provided with complementary holes 19 to receive these projections and thereby tie the ends of the rim together. The openings 19 are somewhat elongated, as shown in Fig. 3 to permit the slight movement of the ends of the rim from and toward each other, referred to above. The rim section 16 and the plate 17 are each provided with a central hole to receive the tire valve 20. The tire valve is threaded and is provided with a nut 21 adapted to retain the plate 17 in position once the parts have been assembled. The valve stem thus acts as a bolt to clamp these two parts together. To reduce the number of loose parts in the device I prefer to rigidly mount the plate 17 upon the rim section 16 by means of rivets or other fasteners 22. I make the projections 18 long enough to enter into holes or sockets 23 formed in the periphery of the wheel, and they thereby interlock the rim with the wheel, to prevent its circumferential movement thereon.

I make the wheel somewhat smaller in diameter than the rim and thereby provide an annular space 24 between the inner face of the rim and the outer periphery of the wheel, and I make use of this space for the insertion of the clamps 5, as hereinafter described. Each of the rim clamps 5 comprises a nut 25 fixed to the felly adjacent the periphery of the wheel and adapted to receive the threaded end of a clamping bolt 26. This bolt extends through the felly and carries a rim clamp 27 rotatably mounted on the shank of the bolt beneath the head 28 thereof. The bolt is provided with a collar 29 which is adapted to forcibly withdraw the clamp 26 from its clamping position when the bolt is rotated to withdraw it from the nut. The clamp 27 is conformed on its outer end to the inner surface of the bearing portion 8 of the rim and is provided with a wedging toe portion 30 adapted to enter the annular space 24. The clamp 27 is provided with a shank or tail portion 31 which has a slotted opening 32 for the reception of the bolt 26 and by means of which it is mounted upon the bolt. This clamp is adapted to be held firmly against the face of the felly and is held rigidly in such position when serving to retain the rim upon the wheel, as indicated in Fig. 4. These members thereby provide a removable rim seat upon one edge of the felly of substantially the same circumference as the rim seat provided by the annular flange 4 upon the other side of the felly. I make the tire rim 6 of such a size that when the tire is firmly mounted upon the wheel and the parts are at normal temperature, a relatively small space will be provided between each end of the rim and the adjacent end of the minor section 16, and thereafter if the rim should have a tendency either through wear or expansion due to heat to become loosened upon its rim seats, it will be held in firm contact therewith by the compressive action of the pneumatic tire, it being understood that this compressive action amounts to many tons pressure.

As many modifications of my invention will readily suggest themselves to one skilled in the art, I do not limit or confine my invention to the specific forms or structures herein shown and described.

Having thus fully described my invention I claim as new and desire to secure by Letters Patent.

1. A tire carrying rim in the form of a split ring the ends thereof being separated to form a gap, said rim having a substantially cylindrical middle portion bordered by outwardly inclined bearing portions which terminate in integral outwardly extending tire engaging and retaining flanges, a relatively short rim section of substantially identical cross sectional shape with the rim arranged between the ends of the rim and substantially filling the gap, a bridge plate conformed to and with the inner periphery of the rim spanning the gap and means for connecting the bridge member to the ends of the rim and means immovably fixing the bridge member to the removable section, substantially as described.

2. A flanged tire carrying rim in the form of a ring cut apart at one point and thereby provided with a gap, a rim section substantially filling the gap, a bridge plate arranged against the inner periphery of the rim spanning the gap, inwardly projecting dowel pins on the ends of the rim, said bridge plate being provided with elongated openings receiving said dowels and thereby connecting the ends of the rim together and means immovably securing the removable rim section to the bridge plate, substantially as described.

3. A flanged tire carrying rim in the form of a ring severed at one point and thereby provided with a gap, a removable rim section, having a valve stem hole, arranged between the ends of the rim and substantially filling the gap and a bridge plate conformed to and with the inner periphery of the rim immovably fixed to the removable rim section and having a valve stem hole registering with the valve stem hole in said removable section and loosely connecting the ends of the rim together, substantially as described.

4. A flanged tire carrying rim divided circumferentially into a major and a minor portion, the major portion having inwardly extending tapered projections adjacent its ends, a bridge plate arranged against the inner periphery of the rim rigidly connected to the minor portion and provided with openings to receive said projections, substantially as described.

5. A flanged tire carrying rim divided circumferentially into a major and a minor portion, the major portion having inwardly extending tapered projections adjacent its ends, a bridge plate arranged against the inner periphery of the rim rigidly connected to the minor portion and provided with openings to receive said dowels, said minor portion and bridge plate having registering openings forming a valve stem hole, substantially as described.

6. A main transversely split tire-containing rim having a relatively small gap, in combination with a single removable section of tire-containing form adapted for insertion in said gap and substantially filling same, a bridge member immovably secured to the removable section and of greater length than said gap, studs on the main tire containing rim adjacent the ends thereof, said bridge member containing openings to permit engagement of the bridge member with the studs.

7. A main transversely split tire-containing rim having a relatively small gap in combination with a single removable section of tire containing form adapted for insertion into said gap, and adapted substantially to close the same, a single bridge member immovably secured to said removable section, both the bridge member and removable section being provided with an opening for the valve stem of a pneumatic tire, studs on the main tire-containing rim adjacent the ends thereof, said bridge member containing openings for the admission of said studs.

In testimony whereof, I have hereunto set my hand, this 12th day of March, 1912, in the presence of two subscribing witnesses.

ERLE K. BAKER.

Witnesses:
EDWARD F. WILSON,
JOHN R. LEFEVRE.